US012768220B2

(12) United States Patent
Dzierzak

(10) Patent No.: US 12,768,220 B2

(45) Date of Patent: Oct. 20, 2026

(54) CORD SPOOL ASSEMBLY

(71) Applicant: Hunter Douglas Industries B.V., Rotterdam (NL)

(72) Inventor: Jakub Dzierzak, Rotterdam (NL)

(73) Assignee: Hunter Douglas Industries B.V., Rotterdam (NL)

(*) Notice: Subject to any disclaimer, the term of this patent is extended or adjusted under 35 U.S.C. 154(b) by 151 days.

(21) Appl. No.: 18/711,413

(22) PCT Filed: Nov. 3, 2022

(86) PCT No.: PCT/EP2022/080695

§ 371 (c)(1),
(2) Date: May 17, 2024

(87) PCT Pub. No.: WO2023/088688

PCT Pub. Date: May 25, 2023

(65) Prior Publication Data

US 2025/0027362 A1 Jan. 23, 2025

(30) Foreign Application Priority Data

Nov. 17, 2021 (GB) ..................................... 2116535

(51) Int. Cl.

*E06B 9/322* (2006.01)
*E06B 9/323* (2006.01)
*E06B 9/262* (2006.01)

(52) U.S. Cl.

CPC .............. *E06B 9/322* (2013.01); *E06B 9/323* (2013.01); *E06B 9/262* (2013.01); (Continued)

(58) Field of Classification Search

CPC .......... E06B 9/322; E06B 9/323; E06B 9/262; E06B 2009/3222; E06B 2009/32225; E06B 2009/2625

See application file for complete search history.

(56) References Cited

U.S. PATENT DOCUMENTS 9,988,837 B2 * 6/2018 Defenbaugh ........... E06B 9/322
2012/0111509 A1 * 5/2012 Mullet .................... E06B 9/323 160/331

(Continued)

FOREIGN PATENT DOCUMENTS

EP 3054 076 A1 8/2016
JP 2010101069 A * 5/2010

(Continued)

OTHER PUBLICATIONS

International Search Report for PCT/EP2022/080695, mailed on Feb. 23, 2023, 3 pages.

*Primary Examiner* — Beth A Aubrey

(74) *Attorney, Agent, or Firm* — Dority & Manning, P.A.

(57) ABSTRACT

A cord spool assembly for an architectural covering includes a housing, a first cord spool and a second cord spool. The housing is configured to support the first and second cord spools for rotation about first and second axes, respectively. The first and second axes extend in a first direction, and the first and second cord spools are supported side-by-side in a second direction perpendicular to the first direction. The housing has a depth in a third direction perpendicular to the first and second directions. The housing defines one or more apertures for guiding a first cord to and from the first cord spool out of the housing and one or more apertures for guiding a second cord to and from the second cord spool out of the housing.

17 Claims, 8 Drawing Sheets

(52) U.S. Cl.
CPC ................. *E06B 2009/2625* (2013.01); *E06B 2009/3222* (2013.01); *E06B 2009/3225* (2013.01)

(56) References Cited

U.S. PATENT DOCUMENTS

| | | | | |
|---|---|---|---|---|
| 2014/0014279 | A1* | 1/2014 | Defenbaugh | E06B 9/68 160/168.1 P |
| 2016/0053534 | A1 | 2/2016 | Chang | |
| 2018/0000273 | A1 | 1/2018 | Wu et al. | |
| 2022/0205320 | A1* | 6/2022 | Chen | E06B 9/262 |
| 2022/0412159 | A1* | 12/2022 | He | E06B 9/327 |
| 2024/0384591 | A1* | 11/2024 | Bohlen | E06B 9/322 |

FOREIGN PATENT DOCUMENTS

| | | | | |
|---|---|---|---|---|
| JP | 5700671 | B2 | * | 4/2015 |
| JP | 6282064 | B2 | * | 2/2018 |
| WO | WO2014/171422 | A1 | | 10/2014 |

* cited by examiner

CORD SPOOL ASSEMBLY

CROSS-REFERENCE TO RELATED APPLICATIONS

The present application is a national phase entry of International Patent Application No. PCT/EP2022/080695, filed on Nov. 3, 2022, which, in turn, claims the right of priority to GB Patent Application No. 2116535.2, filed Nov. 17, 2021, the disclosures of both of which are hereby incorporated by reference herein in their entirety for all purposes.

FIELD

The present application relates to a cord spool assembly, in particular for use with an architectural covering.

BACKGROUND

A variety of different types of architectural covering are known in which the covering itself is deployed and retracted by means of various cords and/or the orientation/position of selective parts of the covering may be changed by means of various cords. One or more cord spool assemblies may be provided. These include selectively controllable spools about which respective cords are wound and unwound.

In some types of architectural covering, such as a top-down-bottom-up free hanging blinds, in which there are two movable rails with blind material extending between them, it may be desirable to provide a pair of cord spools. One cord spool of the pair may be used to operate one movable rail and the other cord spool of the pair may be used to operate the other movable rail. Such pairs of cord spools may also be used in other types of architectural covering for achieving two respective functions.

It is known for cord spools to be located directly over the respective cord holes of the lift cords in the headrail. It is also known for cords to be diverted from the respective cord spool assembly along the headrail and then down through the appropriate cord hole.

It would be desirable to provide improved cord spool assemblies which may be used more effectively in these various situations and allow straightforward installation.

SUMMARY

According to the present invention, there is provided a cord spool assembly for an architectural covering. The assembly includes a housing, a first cord spool, and a second cord spool. The housing is configured to support the first cord spool for rotation about a first axis and to support the second cord spool for rotation about a second axis. The first axis and the second axis extend longitudinally in a first direction such that the first axis is parallel with the second axis. The first cord spool and the second cord spool are supported side-by-side in a second direction perpendicular to the first direction. The housing has an upper portion and a lower portion and has a depth in a third direction perpendicular to the first and second directions. The depth of the housing extends in the third direction from the upper portion to the lower portion. The first cord spool is configured to supply and withdraw a first cord through the lower portion of the housing and the second cord spool is configured to supply and withdraw a second cord through the lower portion of the housing. The housing defines, in the lower portion, a first bottom aperture facing in the third direction for guiding the first cord to and from the first cord spool out of the housing in the third direction and a second bottom aperture facing in the third direction for guiding the second cord to and from the second cord spool out of the housing in the third direction. The housing also defines, in the lower portion, a first side aperture facing in the first direction for guiding the first cord to and from the first cord spool out of the housing in the first direction and a second side aperture facing in the first direction for guiding the second cord to and from the second cord spool out of the housing in the first direction.

In this way, only one housing is required for the two cord spools such that manufacturing efficiency is improved. The two cord spools may be driven usually by parallel shafts extending into the housing to operate the two respective cord spools. By virtue of both the bottom apertures and the side apertures, the single design of cord spool assembly may be used in alternative locations, either directly over the cord holes of the headrail to which the cord spool assembly is mounted or located away from the cord holes along the length of the headrail. Of course, the arrangement also allows for one cord to pass from the cord spool assembly directly through a corresponding cord hole below it whilst the other cord extends along the headrail before then passing through a respective cord hole remote from the cord spool assembly.

The lower portion may include a nose portion having a distal end, the nose portion extending in the third direction and extending to the distal end. The distal end may define the first and second bottom apertures. The nose portion may also define an internal space configured to accommodate the first cord extending from the first cord spool to and out of the first bottom aperture and the second cord extending from the second cord spool to and out of the second bottom aperture.

The nose portion allows the first and second bottom apertures to be located close to cord holes in the headrail directly below it.

The nose portion may have a side wall extending in the third direction and extending to the distal end, the side wall facing in the first direction. The side wall may define the first and second side apertures. The internal space may be configured to accommodate the first cord extending from the first cord spool to and out of the first side aperture and to accommodate the second cord extending from the second cord spool to and out of the second side aperture.

In this way, the nose portion also provides, in the housing, an appropriate space and location for the first and second side apertures facing along the headrail.

Both the bottom apertures and the side apertures may be of a size and shape merely sufficient to allow passing of a respective cord. During assembly, the user/installer can decide whether to thread the respective cord through either a bottom aperture or a side aperture. Both types of aperture may be the same size and shape. However, the first side aperture may be elongate in the third direction and the second side aperture may be elongate in the third direction.

In practice, threading a cord directly down through a bottom aperture is easier than threading it to the side through a side aperture. By making the side apertures elongate in the third direction, it is easier for the user/assembler to thread a cord through a side aperture.

The housing may define a first guide surface which transitions continuously from the third direction to the first direction and is thereby configured to guide the first cord from extending in the third direction from the first cord spool to the first direction out of the first side aperture. The housing may also define a second guide surface which transitions continuously from the third direction to the first direction and is thereby configured to guide the second cord from extending in the third direction from the second cord spool to the first direction out of the second side aperture. As will be understood, such guide surfaces will reduce wear of the cords when they are wound and unwound from the spools and change direction from the first direction to the third direction. The first and second guide surfaces may be two adjacent parts of the same single guide surface.

It is possible for the guide surfaces to be part of the nose portion, for instance formed as an internal part of the side wall leading to the side apertures. However, the housing may have a tongue portion extending within the internal space and extending in the third direction. The tongue portion may have an end portion adjacent the first and second side apertures, the first and second guide surfaces being provided on the end portion.

In practice, it may be easier to provide/form better guide surfaces on a separate component, rather than the internal part of the nose portion. This may be achieved with the tongue portion.

The tongue portion may extend from the upper portion of the housing to the end portion.

The end portion may be configured to terminate adjacent an upper end of the side apertures, especially in arrangements in which the side apertures are not elongate. Alternatively, the end portion, at an upper side towards the upper portion, may partly block the first side aperture so that the available cross section for passage of the first cord out of the housing in the first direction is reduced accordingly in the third direction. The end portion may also partly block the second side aperture so that the available cross section for passage of the second cord out of the housing in the first direction is reduced accordingly in the third direction.

In this way, elongate side apertures may be provide so as to facilitate threading of cords through those side apertures. However, the tongue, in particular its end portion, will then reduce the elongate opening provided by the apertures resulting in a smaller aperture located towards the lower end of the elongate side apertures, positioned appropriately for the respective cords to pass along the headrail. Guiding of the cords is thus better controlled and winding up onto the spools is more stable/predictable.

The end portion of the tongue may also include extensions in the third direction so as to form a fork shape on the end of the tongue. The extensions may cover more of the side apertures, in particular on the outer sides in the second direction. The upper portions of the side apertures may be formed with a larger width in the second direction to be partially closed off by the extensions. The inner side walls of the extensions may thus prevent cords from getting between the tongue portion of the upper portion and the nose portion of the lower portion.

It would be possible for the first and second bottom apertures to be located side-by-side in any desired orientation. However, the first bottom aperture and the second bottom aperture are preferably side-by-side in the second direction.

In this way, in use with the first direction of the cord spool assembly along the elongate extent of a headrail, first and second cords extending from the first and second bottom apertures will be directly aligned one behind the other in the second direction. As a result, in an installed architectural covering, one cord will be hidden behind the other when viewing the architectural covering from one side, namely from the front end in the second direction.

Although it would be possible to provide the upper and lower portions of the housing as a single component (for example the housing could be separable along a plane including the second and third directions), preferably, the upper portion and the lower portion of the housing are separate parts assembled together to form the housing.

Consequentially, the present invention provides a method of assembling a cord spool assembly. The method includes, with an upper portion of an assembly housing separated from a lower portion of the housing, feeding a first cord through either a first bottom aperture or a first side aperture and feeding a second cord through either a second bottom aperture or a second side aperture. The method includes then assembling the upper portion and the lower portion to form the housing. This includes inserting a tongue portion of the upper portion within an internal space of a nose portion of the lower portion. In the case of the first cord passing through a first side aperture, a first guide surface of the end portion locates the first cord. In the case of the second cord passing through a second side aperture, a second guide surface of the end portion locates the second cord.

This allows a user/assembler to thread a cord through a respective side aperture before the tongue portion subsequently guides that cord into position within the respective side aperture and locate it accordingly.

The present invention also provides an architectural covering including the cord assembly and a headrail having an elongate extent, wherein the spool assembly is configured to be mounted to the headrail with the first direction parallel to the elongate extent of the headrail.

A plurality of such cord assemblies may be provided and mounted to the headrail in the same way.

At some position along the headrail, respective motors may be provided for driving the cord spools of the cord spool assemblies. Drive shafts may be provided running along the elongate length of the headrail in the first direction and passing into the housing of a respective cord spool assembly to drive the respective cord spools, the drive shaft being driven by the motors.

The headrail may include at least one through hole for passage of the first cord and the second cord from the cord spool assembly through the headrail in the third direction.

In particular, a single larger through hole may be provided for passage of both the first cord and the second cord or smaller respective through holes may be provided individually for respective first and second cords.

The cord spool assembly may be configured to be mounted to the headrail with the first and second bottom apertures facing, in the third direction, the at least one through hole so that the first and second cords are able to extend in the third direction directly through the first and second bottom apertures and the at least one through hole.

The cord spool assembly may be configured to be mounted to the headrail at a position remote, in the first direction, from the at least one through hole. The first and second cords are able to extend out of the first and second side apertures in the first direction, extend to the at least one through hole and then extend through the at least one through hole in the third direction.

As noted above, with this configuration, where there is an at least one through hole at two different locations along the length of the headrail, it is possible for the cord spool assembly to be mounted directly above one at least one through hole so that one of the cords extends in the third direction directly through the respective bottom aperture with another of the cords extending out of the respective side aperture along the headrail to the other of the at least one through hole.

In situations where the cord spool assembly is mounted to the headrail at a position remote from the at least one through hole, it is possible for the cord or cords to pass through the at least one through hole in any known and/or conventional manner. However, the present invention also provides a grommet.

According to the present invention, there is provided a grommet configured to be mounted in, adjacent or to the at least one through hole. The grommet defines a first passage for guiding, in the third direction, the first cord through the at least one through hole and a second passage for guiding, in the third direction, the second cord through the at least one through hole.

The first passage and the second passage are preferably side-by-side in the second direction.

The grommet may include a first transition surface that transitions continuously from the first direction to the third direction and is configured to guide the first cord extending from the cord spool assembly in the first direction to and through the first passage extending in the third direction. The grommet may also include a second transition surface that transitions continuously from the first direction to the third direction and is configured to guide the second cord extending from the cord spool assembly in the first direction to and through the second passage extending in the third direction.

Use of such a grommet reduces wear on the cords as they are wound onto and unwound from the spools and they transition from the first direction along the headrail to the third direction through and out of the grommet. Also, by providing the first and second passages in the side-by-side second direction, the cords extending below the headrail are positioned one behind the other. As explained above, when viewed from one side of the architectural covering, one cord is thus hidden behind the other.

BRIEF DESCRIPTION OF THE FIGURES

The invention will be more clearly understood from the following description, given by way of example only, with reference to the accompanying drawings, in which.

DETAILED DESCRIPTION

A large variety of architectural coverings exist in which portions of the architectural covering are controlled by means of a cord. Such architectural coverings include venetian blinds etc. The present invention is described with reference to a top-down-bottom-up free hanging blind. However, the cord spool assembly of the present invention could be used in any appropriate architectural covering and need not only be mounted in the headrail of such a covering.

Figure 1:
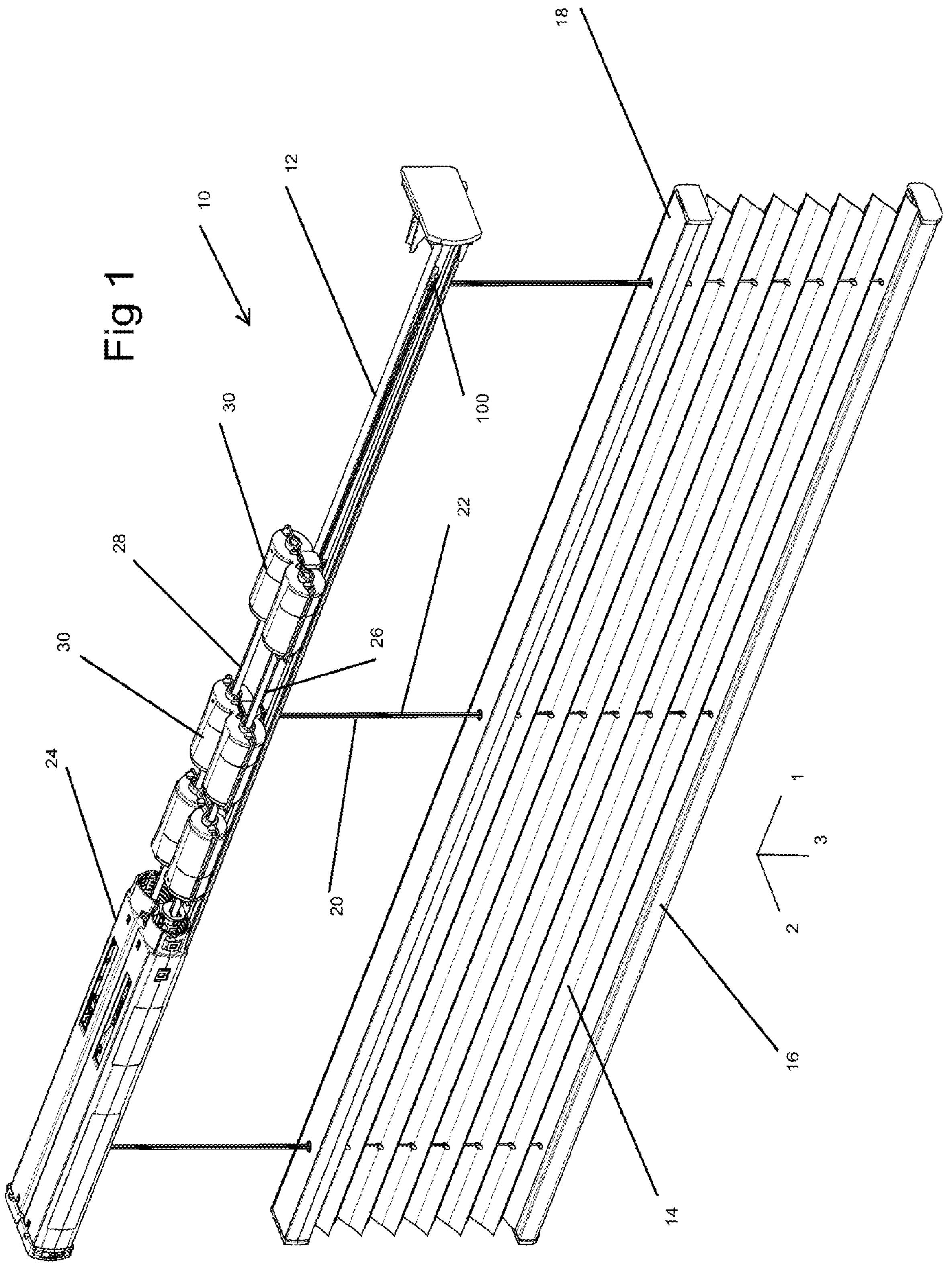
FIG. 1 illustrates an architectural covering including cord spool assemblies according to the present invention.

The architectural covering 10 illustrated in FIG. 1 is a top-down-bottom-up free hanging blind. In the illustration of FIG. 1, the outer housing of the headrail 12 is removed so as to show the components mounted within the headrail 12. A blind material 14 extends between a bottom rail 16 and a middle rail 18 and first and second cords 20, 22 support respectively the bottom rail 16 and the middle rail 18. The first cords 20 which support the lower rail 16 may be selectively extended or retracted so as to lower or raise the bottom rail 16. Similarly, the second cords 22 which support the middle rail 18 may be extended or retracted so as to lower or raise the middle rail 18. The lower rail 16 and middle rail 18 may be moved towards one another or away from one another so as to reduce or increase the extent to which the blind material 14 covers the architectural opening against which the architectural covering 10 is mounted.

In the illustrated arrangement, a motor unit 24 is mounted to the headrail 12. Control shafts 26, 28 extend in a first direction along the elongate extent of the headrail 12. The shafts 26, 28 are independently and selectively rotatable about their axis and are driven by respective motors in the motor unit 24.

As illustrated, three cord spool assemblies 30 are provided at respective positions along the elongate extent of the headrail 12. Each of the cord spool assemblies 30 receives drive from the pair of drive shafts 26, 28. In the illustrated arrangement, the cord spool assemblies 30 are configured to allow the drive shafts 26, 28 to pass entirely through them, thereby allowing the series of cord spool assemblies 30 arranged in the first direction along the elongate extent of the headrail 12 to be driven together by the same respective shafts 26, 28.

Figures 2A, 2B:
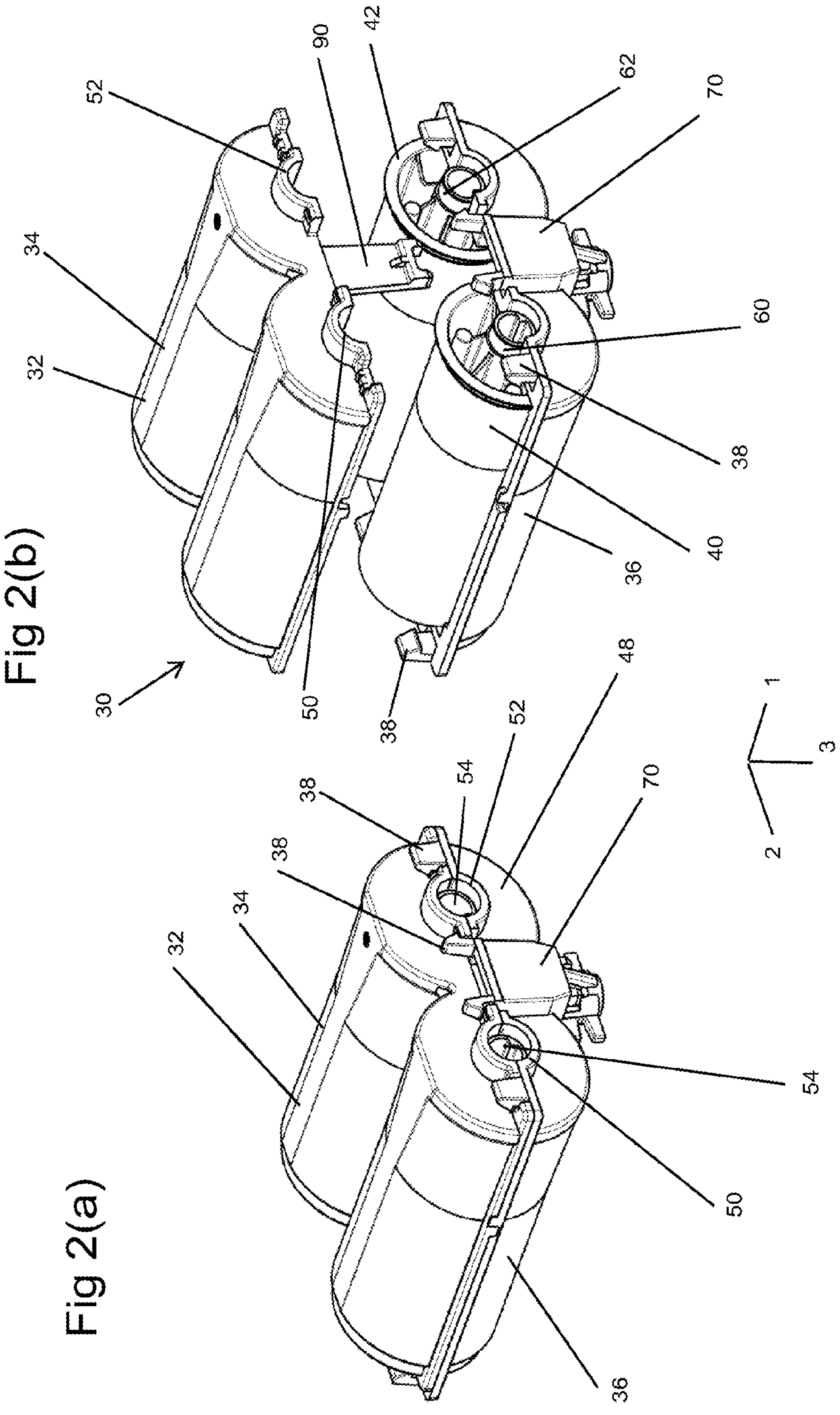
FIGS. 2(*a*) and (*b*) illustrate a cord spool assembly according to the present invention.

FIGS. 2(*a*) and (*b*) and 3(*a*) and (*b*) illustrate one of the cord spool assemblies 30.

The cord spool assembly 30 has a housing 32 with an upper portion 34 and a lower portion 36. In the illustrated arrangement, as shown in FIGS. 2(*b*) and 3(*b*) the upper portion 34 and lower portion 36 are separate components which are assembled together as part of the housing 32. Any appropriate means of attaching/connecting the upper portion 34 to the lower portion 36 can be used. In the illustrated arrangement, a series of resilient claws 38 on one of the two portions (in the illustrated example the lower portion 36) engage with the other portion.

Figure 3B:
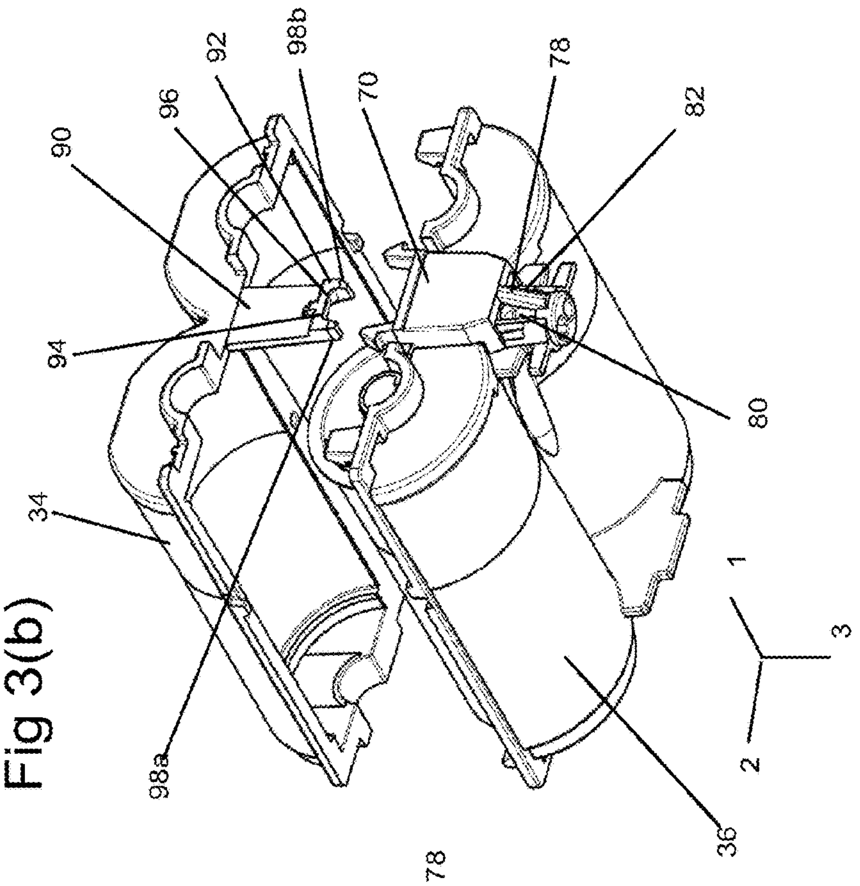
FIGS. 3(*a*) and (*b*) illustrate the cord spool assembly.
Figure 3A:
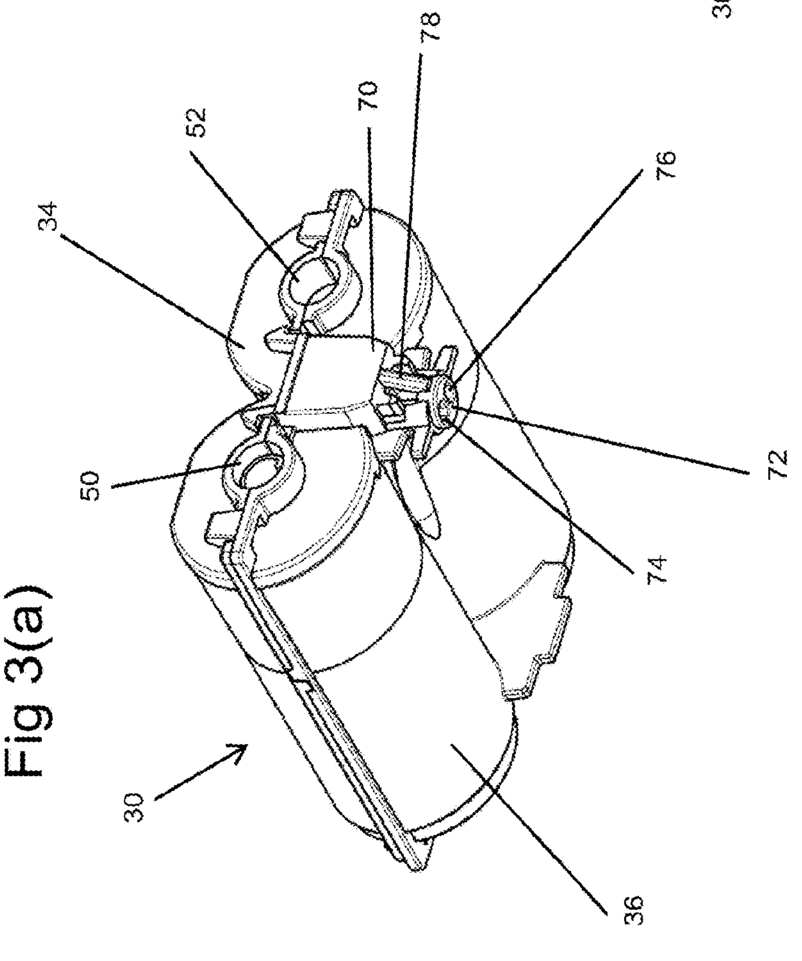

Housed within the housing 32 are a first cord spool 40 and a second cord spool 42. The second cord spool 42 is not illustrated in FIGS. 3(*a*) and (*b*). The housing 32 is configured to support the first cord spool 40 and the second cord spool 42. In the illustrated arrangement, the housing 32 defines cylindrical inner surfaces matching and facing the corresponding respective cord spools 40, 42 (with a cord wrapped around the corresponding respective cord spool 40, 42).

The housing 32 supports the first cord spool 40 for rotation about a first axis and supports the second cord spool 42 for rotation about a second axis. As illustrated, the first and second axes are parallel and extend in a first direction (to extend along the elongate extent of the headrail 12). The cord spool assembly 30 has a width in a second direction perpendicular to the first direction and has a height in a third direction perpendicular to the first and second directions.

As illustrated, the first axis and the second axis are arranged side-by-side in the second direction.

At least one end 48 of the housing 32 is provided with shaft receiving holes 50, 52 for receiving a respective drive shaft 26, 28. In particular, a drive shaft 26, 28 passes through the respective receiving hole 50, 52 and engages in a socket

54 in the respective cord spool 40,42 so as to rotationally drive that cord spool 40, 42 about its axis.

In the illustrated arrangement, the housing 30 has shaft receiving openings at both respective ends and the respective cord spools 40, 42 have not merely sockets but channels allowing the respective drive shafts 26, 28 to pass all the way through the cord spools 40, 42.

As illustrated, the first cord spool 40 and the second cord spool 42 include axial cylindrical protrusions 60, 62 surrounding the drive shaft receiving sockets 54. The cylindrical protrusions 60, 62 are of a shape and size configured to fit within the openings 50, 52 acting as bearing surfaces. In this way, the openings 50, 52 of the housing 32 support the first and second cord spools 40, 42 for rotation about the first and second axes respectively.

In summary, the motor unit 24 illustrated in FIG. 1 rotates respectively the drive shafts 26, 28 which pass through the openings 50, 52 so as to engage in the sockets 54 of the first cord spool 40 and second cord spool 42 respectively. A first cord 20 may be wound onto and unwound from the first cord spool 40 by rotating the first cord spool 40. Similarly, a second cord 22 may be wound onto and unwound from the second cord spool 42 by rotating the second cord spool 42.

As illustrated, the housing 32 of the cord spool assembly 30 includes a nose portion 70. This is provided at the end 48 of the housing 32 and, in the illustrated arrangement, forms part of the lower portion 36.

The nose portion 70 extends and/or protrudes downwardly in the third direction and has a distal end 72 positioned away from and furthest from the rest of the housing 32. As illustrated, the distal end 72 defines a first bottom aperture 74 and a second bottom aperture 76. The first bottom aperture 74 corresponds to the first cord spool 40 and the second bottom aperture 76 corresponds to the second cord spool 42. In particular, a first cord 20 wound around and extending from the first cord spool 40 may exit the housing 32 of the cord spool assembly 30 through the first bottom aperture 74. Similarly, a second cord wound around and extending from the second cord spool 42 may exit the housing 32 of the cord spool assembly 30 through the second bottom aperture 76.

The first bottom aperture 74 and second bottom aperture 76 are located and positioned in the nose portion 70 such that the first cord 20 and second cord 22 can exit directly in the third direction below the cord spool assembly 30 through one or more corresponding apertures in the headrail 12.

As illustrated, the nose portion 70 also includes a side wall 78 which extends in the third direction between the distal end 72 and the rest of the housing 32. The side wall 78 defines a first side aperture 80 and a second side aperture 82. The first side aperture 80 corresponds to the first cord spool 40 and the second side aperture 82 corresponds to the second cord spool 42. In particular, the first cord 20 wound around the first cord spool 40 may exit the housing 32 through the first side aperture 80 instead of the first bottom aperture 74. Similarly, the second cord 22 wound around the second cord spool 42 may exit the housing 32 through the second side aperture 82 instead of the second bottom aperture 76. The first cord 20 exits the first side aperture 80 in the first direction parallel with the longitudinal extent of the headrail 12 and the second cord 22 exits the second side aperture 82 in the first direction parallel with the longitudinal extent of the headrail 12.

Figure 4:
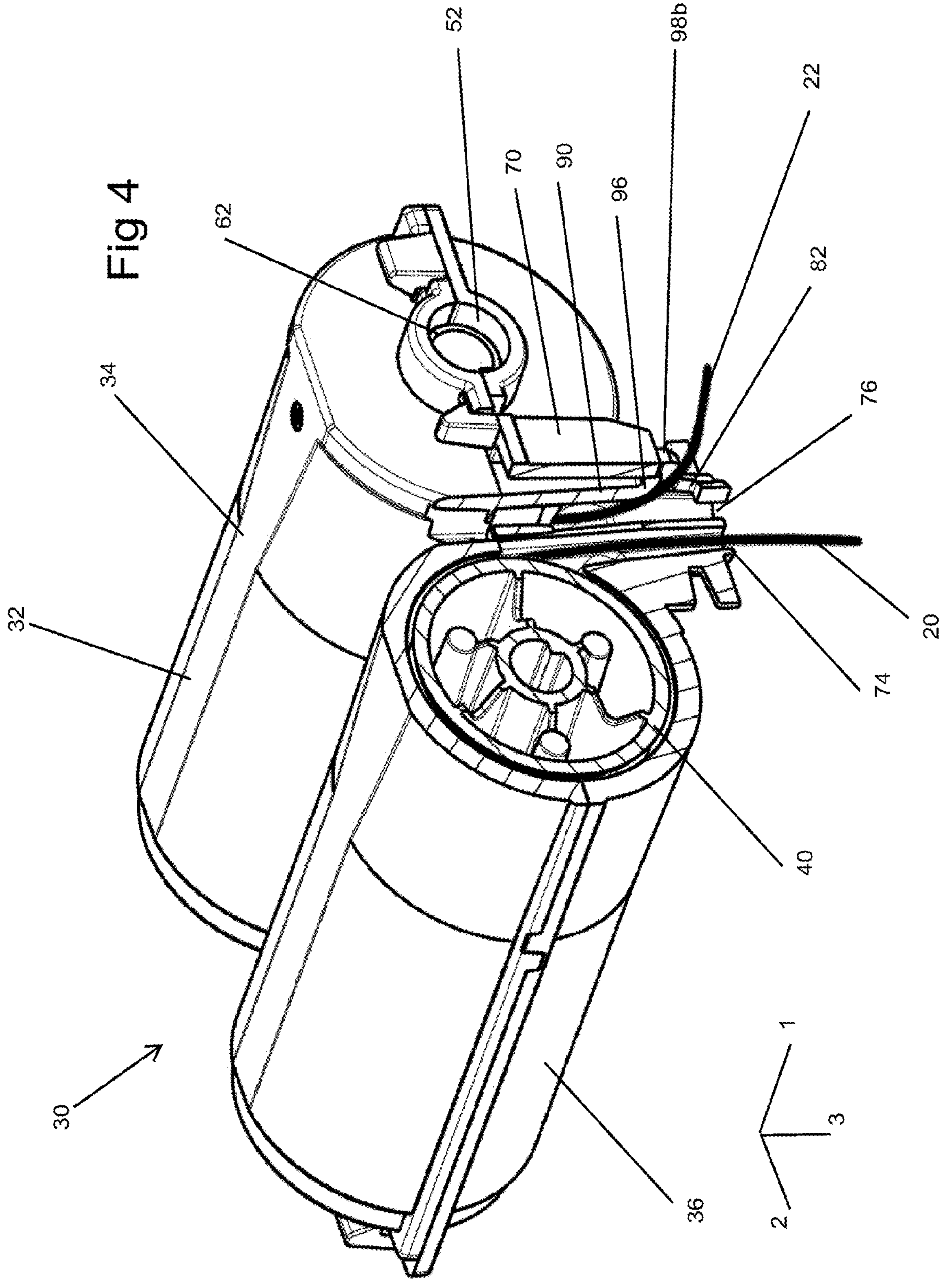
FIG. 4 illustrates the cord spool assembly with first and second cords.

FIG. 4 illustrates a partial cutaway of the cord spool assembly 30 with a cut through the end of the first cord spool 40 and the middle of the nose portion 70. In this illustration, a first cord 20 extends from the first cord spool 40 in the third direction directly out of the first bottom aperture 74 whilst a second cord 22 extends from the second cord spool 42 out of the second side aperture 82 in the first direction so as to extend parallel with the headrail 12.

As illustrated, the first and second bottom apertures 74, 76 are of generally circular cross-section and have a size appropriate for guiding the first and second cords 20, 22 appropriately. On the other hand, the first and second side apertures 80, 82 have an elongate extent in the third direction. In a state before complete assembly as illustrated in FIGS. 2(*b*) and 3(*b*), the user/assembler may choose whether to thread the first cord 20 through either first bottom aperture 74 or the first side aperture 80 and may choose whether to thread the second cord 22 through either the second bottom aperture 76 or the second side aperture 82. By providing the first and second side apertures 80, 82 with an elongate extent, the process of feeding a cord through the respective side aperture 80, 82 is made easier.

As illustrated particularly in FIGS. 2(*b*) and 3(*b*), the housing 32 also includes a tongue portion 90. The tongue portion 90, like the nose portion 70, extends downwardly in the third direction. Indeed, as illustrated, the nose portion 70 and the tongue portion 90 are configured such that, in the fully assembled state, the tongue portion 90 extends in the third direction within the nose portion 70.

Figure 5A:
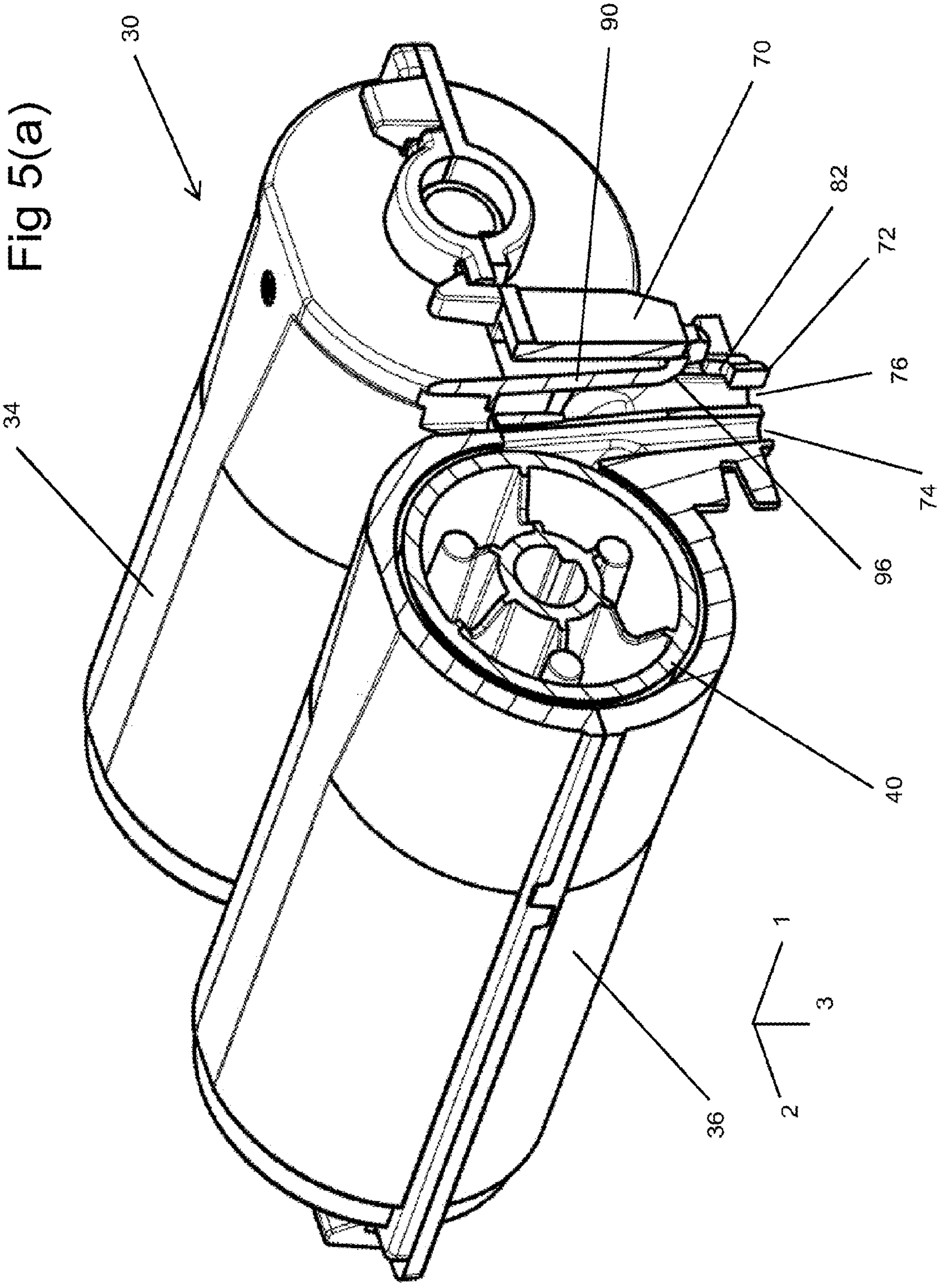
FIGS. 5(*a*) and (*b*) illustrate the cord spool assembly.
Figure 5B:
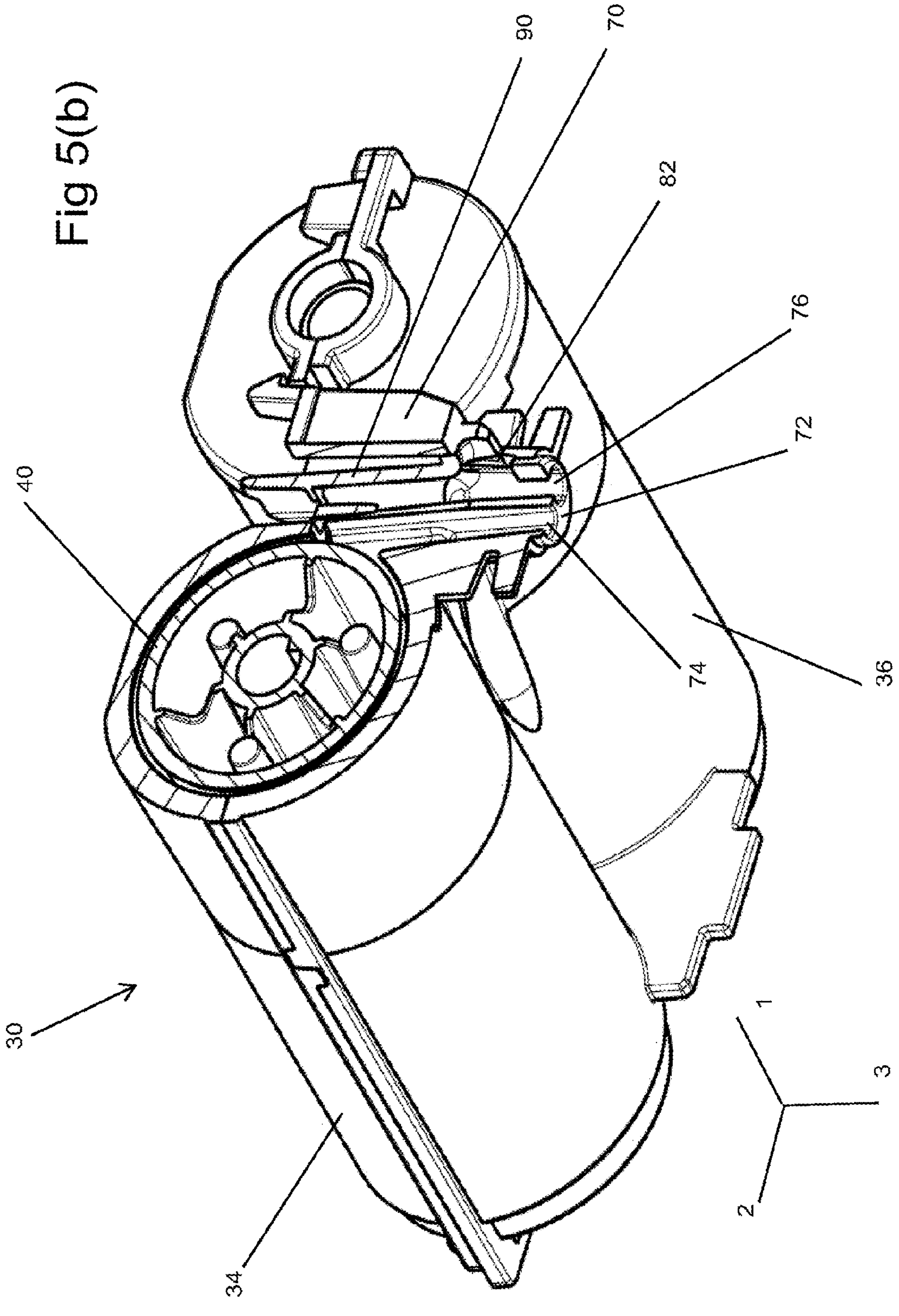

In the illustrated arrangement, the tongue portion 90 extends from the upper portion 34 of the housing 32. It extends to an end portion 92. The end portion 92 as best illustrated in FIGS. 5(*a*) and 5(*b*) (which is equivalent to FIG. 4 described above, but without illustration of the cords 20 and 22) includes a guide surface having adjacent first and second guide surfaces 94, 96, which transition continuously from the third direction to the first direction. As illustrated in FIG. 4, for the second cord 22, the second guide surface 96 thus is configured to guide the second cord 22 from extending in the third direction from the second cord spool 42 to the first direction and out of the second side aperture 82. As will be understood, the first and second guide surfaces 94, 96 thus reduce wear on the first and second cords 20, 22 as they are wound and unwound from the first and second cord spools 40, 42.

In the illustrated arrangement, the end portion 92 also includes extensions 98*a* and 98*b* which protrude downwardly in the third direction from either side (in the second direction) of the tongue portion 90.

As explained above, during the steps of assembly, the user/assembler can choose whether to thread a cord 20, 22 through the respective bottom aperture 74, 76 or side aperture 80, 82. In the illustrated arrangement, the first side aperture 80 and the second side aperture 82 are elongated in the third direction so as to make threading of the respective cords 20. 22 easier. When the upper portion 34 of the housing 32 is assembled to/with the lower portion 36, the upper portion 34 is offered towards the lower portion 36 and the tongue portion 90 is inserted into and guided within the nose portion 70. The extensions 98*a* and 98*b* act to catch between them one or both of the first cord 20 and the second cord 22 already threaded through the respective first side aperture 80 and second side aperture 82. With the cord or cords so caught between the extensions 98*a* and 98*b*, the tongue portion 90 is inserted to its fully installed/assembled position with the cord or cords extending around the first and/or second guide surfaces 94, 96. The extensions 98*a* and 98*b* facilitate assembly and ensure that the first and second cords are correctly positioned.

Figure 6:
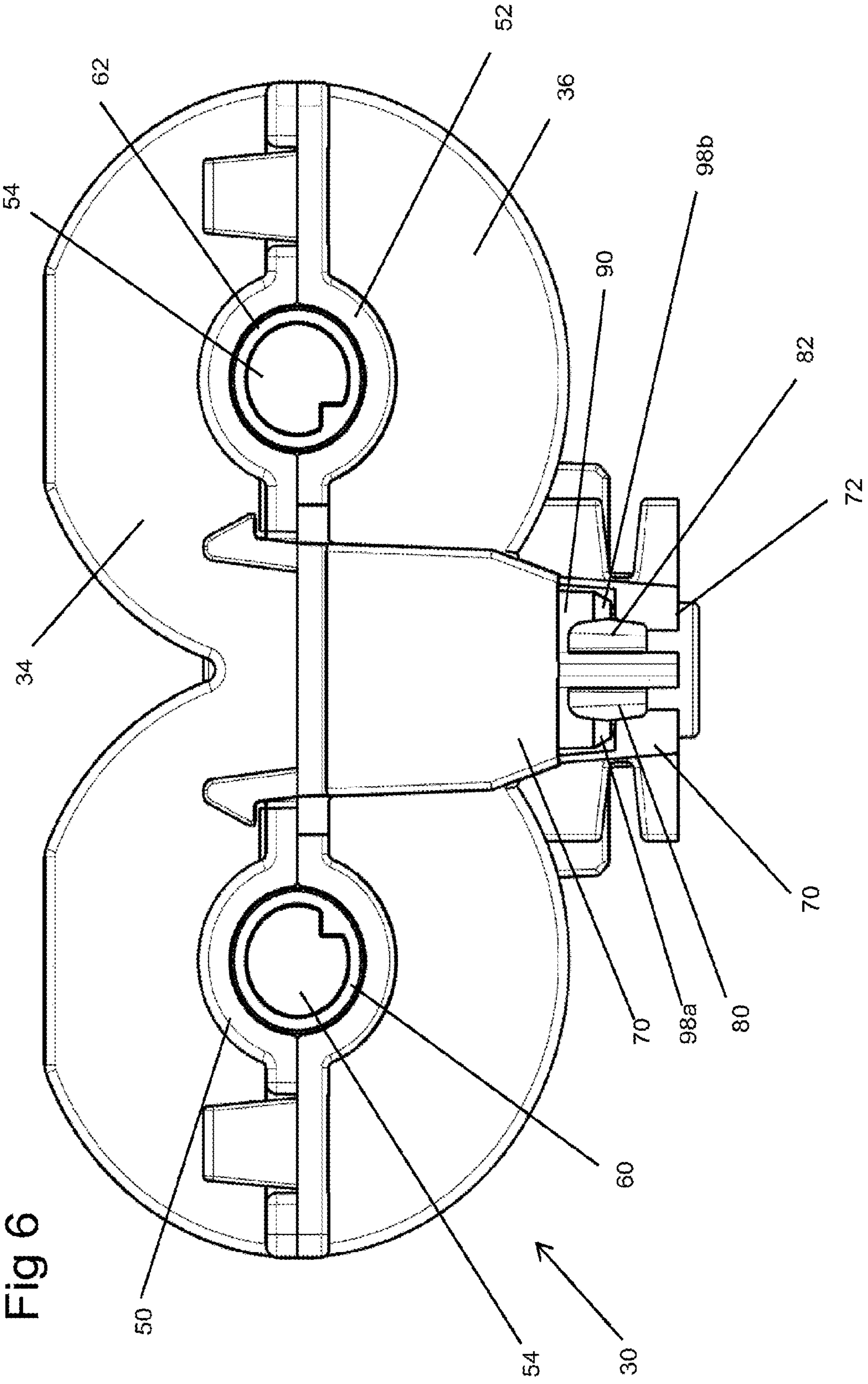
FIG. 6 illustrates the tongue portion in the nose portion.

FIG. 6 illustrates a part of the cord spool assembly 30, in particular showing the tongue portion 90 with its extensions 98*a*, 98*b* fitted in the nose portion 70.

The extensions 98*a* and 98*b* thus form a fork shape at a lower part of the tongue portion 90. In the illustrated arrangement, the extensions 98*a* and 98*b* thus cover more of the side apertures 80, 82, in particular at their outer sides in the second direction. At upper parts of the side apertures 80, 82, the side apertures 80, 82 may have a greater width in the second direction (than at their lower parts). The extensions 98*a*, 98*b* forming the fork shape of the tongue portion 90 may act to partially cover the side apertures 80, 82 at their upper parts and thus partially restrict the opening for the cords. The side walls of the extensions 98*a*, 98*b* may thus prevent the cords from getting in between the upper portion 34 and lower portion 36. The moment tension is applied to one of the cords 20, 22, that cord will set itself in the upper part of the respective side aperture 80, 82.

Figure 7:
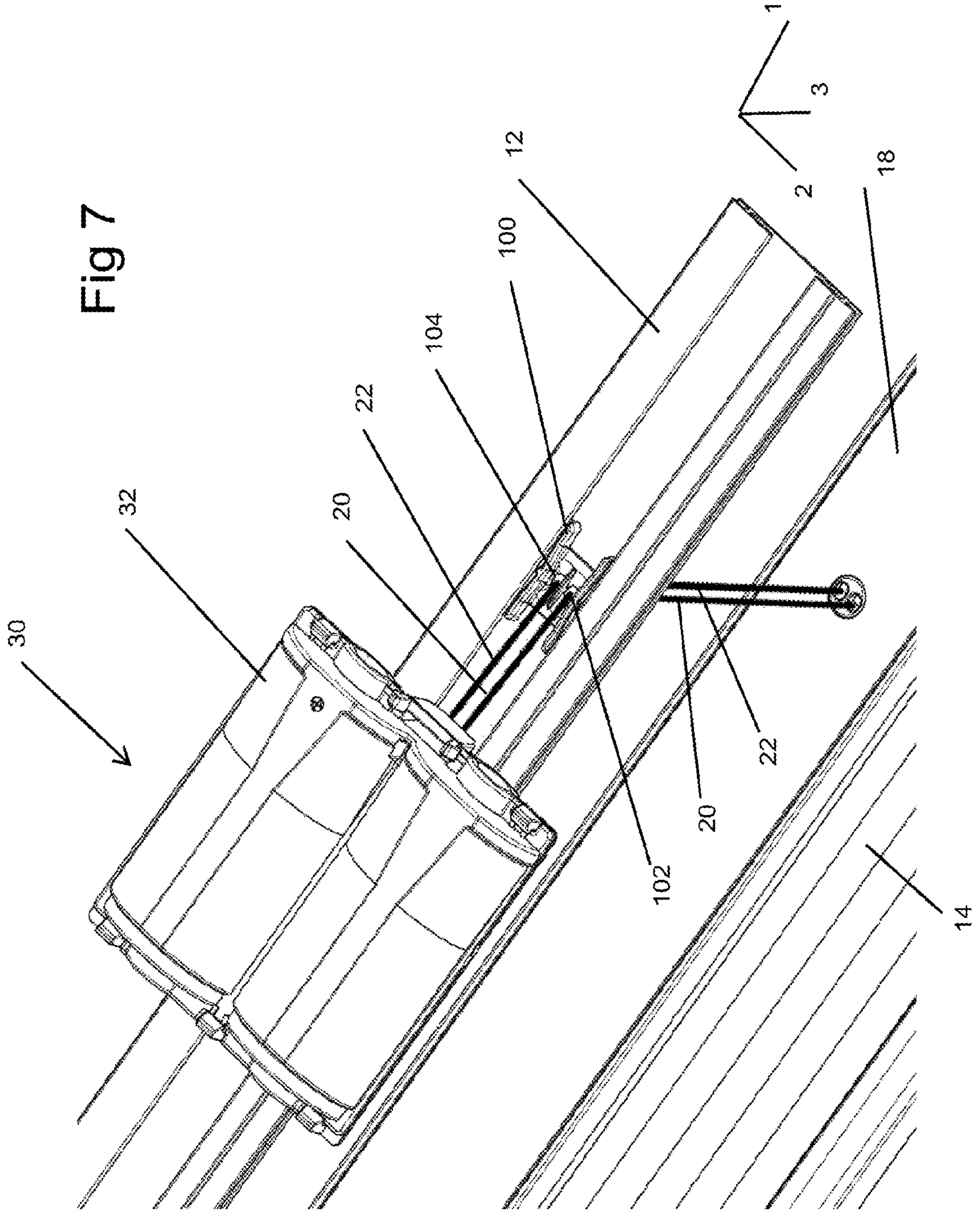
FIG. 7 illustrates the cord spool assembly mounted to a headrail.

FIG. 7 illustrates the cord spool assembly 30 mounted to the headrail 12 at a location remote from the position in the headrail at which the first cord 20 and second cord 22 transition to extending in the third direction towards the middle rail 18.

As illustrated, there is provided a grommet 100 for mounting to the headrail 12. The headrail 12 includes at least one through hole for passage of the first cord 20 and the second cord 22 through the headrail 12 in the third direction. It is possible that the headrail 12 defines only a single through hole through which both the first cord 20 and the second cord 22 pass, or the headrail defines respective through holes for the first cord 20 and the second cord 22. Irrespective, the grommet 100 is mounted to the headrail 12 and defines a first passage 102 for guiding the first cord 20 and a second passage 104 for guiding the second cord 22.

The first passage 102 and the second passage 104 are arranged in the grommet 100 side-by-side in the second direction. As a result, as illustrated in FIG. 7, the first cord 20 and the second cord 22 extend in the third direction below the headrail 12 but align side-by-side in the second direction. This provides a neat appearance for the overall architectural covering. In particular, a user viewing the architectural covering from one side will see only one of the cords with the other concealed behind it.

The grommet 100 also defines a first transition surface that transitions continuously from the first direction to the third direction. This guides the first cord 20 from its path in the first direction from the cord spool assembly 30 and provides a smooth path for the first cord 20 as it changes direction and extends downwardly from the headrail 12 in the third direction. Similarly, the grommet 100 defines a second transition surface that transitions continuously from the first direction to the third direction. This guides the second cord 22 in the same way from its first direction from the cord spool assembly 30 to the third direction extending from the headrail 12. The grommet 100 thus reduces wear on the first and second cords 20, 22 as they are wound and unwound from the first and second cord spools 40, 42.

The grommet may also be used in the middle rail 18 so as to guide the first and second cords 20, 22 at the middle rail 18. In particular, one of the first passage 102 and the second passage 104 may provide for one of the cords 20, 22 to pass directly through the middle rail 18 to the bottom rail 16. On the other hand, for the other of the cords 20, 22 that holds the middle rail 18, the first transition surface or the second transition surface directs that cord in its change of direction from the third direction to the first direction along the middle rail 18. The grommet 100 thus keeps the cords 20 and 22 separated. Furthermore, because the first passage 102 and the second passage 104 are arranged in the grommet 100 side-by-side in the second direction, the first cord 20 and the second cord 22, where they meet the middle rail 18, are also aligned side-by-side in the second direction, thus providing the neat appearance discussed above.

The invention claimed is:

1. A cord spool assembly for an architectural covering, the assembly including:

a housing;

a first cord spool; and a second cord spool; wherein:

the housing is configured to support the first cord spool for rotation about a first axis and to support the second cord spool for rotation about a second axis, the first axis and the second axis extending longitudinally in a first direction such that the first axis is parallel with the second axis, and the first cord spool and the second cord spool being supported side-by-side in a second direction perpendicular to the first direction;

the housing has an upper portion and a lower portion and has a depth in a third direction perpendicular to the first and second directions, the depth of the housing extending in the third direction from the upper portion to the lower portion;

the first cord spool is configured to supply and withdraw a first cord through the lower portion of the housing and the second cord spool is configured to supply and withdraw a second cord through the lower portion of the housing; and the housing defines, in the lower portion, a first bottom aperture facing in the third direction for guiding the first cord to and from the first cord spool out of the housing in the third direction and a second bottom aperture facing in the third direction for guiding the second cord to and from the second cord spool out of the housing in the third direction, and defines, in the lower portion, a first side aperture facing in the first direction for guiding the first cord to and from the first cord spool out of the housing in the first direction and a second side aperture facing in the first direction for guiding the second cord to and from the second cord spool out of the housing in the first direction, wherein the lower portion includes a nose portion having a distal end, the nose portion extending in the third direction to the distal end, and the distal end defining the first and second bottom apertures; and wherein the nose portion defines an internal space configured to accommodate the first cord extending from the first cord spool to and out of the first bottom aperture and the second cord extending from the second cord spool to and out of the second bottom aperture.

2. The cord spool assembly according to claim 1, wherein the nose portion has a side wall extending in the third direction to the distal end and facing in the first direction, and the side wall defines the first and second side apertures; wherein:

the internal space is configured to accommodate the first cord extending from the first cord spool to and out of the first side aperture and to accommodate the second cord extending from the second cord spool to and out of the second side aperture.

3. The cord spool assembly according to claim 2, wherein the first side aperture is elongate in the third direction and the second side aperture is elongate in the third direction.

4. The cord spool assembly according to claim 3, wherein the housing defines a first guide surface which transitions continuously from the third direction to the first direction and is thereby configured to guide the first cord from extending in the third direction from the first cord spool to the first direction out of the first side aperture, and defines a second guide surface which transitions continuously from the third direction to the first direction and is thereby configured to guide the second cord from extending in the third direction from the second cord spool to the first direction out of the second side aperture.

5. The cord spool assembly according to claim 4, wherein the housing has a tongue portion extending within the internal space in the third direction, the tongue portion having an end portion adjacent the first and second side apertures, the first and second guide surfaces being provided on the end portion.

6. The cord spool assembly according to claim 5, wherein the tongue portion extends from the upper portion of the housing to the end portion.

7. The cord spool assembly according to claim 6, wherein the end portion, at an upper side towards the upper portion, partly blocks the first side aperture so that the available cross section for passage of the first cord out of the housing in the first direction is reduced accordingly in the third direction and partly blocks the second side aperture so that the available cross section for passage of the second cord out of the housing in the first direction is reduced accordingly in the third direction.

8. The cord spool assembly according to claim 1, wherein the first bottom aperture and the second bottom aperture are side-by-side in the second direction.

9. The cord spool assembly according to claim 1, wherein the upper portion and the lower portion of the housing are separate parts assembled together to form the housing.

10. An architectural covering including the cord spool assembly according to claim 1 and a headrail having an elongate extent, wherein the cord spool assembly is configured to be mounted to the headrail with the first direction parallel to the elongate extent of the headrail.

11. The architectural covering according to claim 10, wherein the headrail includes at least one through hole for passage of the first cord and the second cord from the cord spool assembly through the headrail in the third direction.

12. The architectural covering according to claim 11, wherein the cord spool assembly is configured to be mounted to the headrail with the first and second bottom apertures facing, in the third direction, the at least one through hole so that the first and second cords are able to extend in the third direction directly through the first and second bottom apertures and the at least one through hole.

13. The architectural covering according to claim 11, wherein the cord spool assembly is configured to be mounted to the headrail at a position remote, in the first direction, from the at least one through hole, whereby the first and second cords are able to extend out of the first and second side apertures in the first direction to the at least one through hole and then through the at least one through hole in the third direction.

14. The architectural covering according to claim 13, further including a grommet configured to be mounted in the at least one through hole and defining a first passage for guiding, in the third direction, the first cord through the at least one through hole and a second passage for guiding, in the third direction, the second cord through the at least one through hole.

15. The architectural covering according to claim 14, wherein the first passage and the second passage are side-by-side in the second direction.

16. The architectural covering according to claim 14, wherein the grommet includes a first transition surface that transitions continuously from the first direction to the third direction and is configured to guide the first cord extending from the cord spool assembly in the first direction to and through the first passage extending in the third direction and a second transition surface that transitions continuously from the first direction to the third direction and is configured to guide the second cord extending from the cord spool assembly in the first direction to and through the second passage extending in the third direction.

17. A method of assembling the cord spool assembly of claim 6, the method including:

with the upper portion of the housing separated from the lower portion of the housing, feeding the first cord through either the first bottom aperture or the first side aperture and feeding the second cord through either the second bottom aperture or the second side aperture;

assembling the upper portion and the lower portion to form the housing, including inserting the tongue portion of the upper portion within the internal space of the nose portion of the lower portion such that, in the case of the first cord passing through the first side aperture, the first guide surface of the end portion locates the first cord and, in the case of the second cord passing through the second side aperture, the second guide surface of the end portion locates the second cord.

* * * * *